(12) United States Patent
Bansal et al.

(10) Patent No.: US 7,831,796 B2
(45) Date of Patent: *Nov. 9, 2010

(54) APPARATUS, SYSTEM, AND METHOD FOR DYNAMICALLY ALLOCATING MAIN MEMORY AMONG A PLURALITY OF APPLICATIONS

(75) Inventors: Sorav Bansal, Stanford, CA (US); Paul Edward McKenney, Beaverton, OR (US); Dharmendra Shantilal Modha, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 100 days.

This patent is subject to a terminal disclaimer.

(21) Appl. No.: 12/265,522

(22) Filed: Nov. 5, 2008

(65) Prior Publication Data

US 2009/0055617 A1 Feb. 26, 2009

Related U.S. Application Data

(63) Continuation of application No. 11/014,529, filed on Dec. 15, 2004, now Pat. No. 7,487,320.

(51) Int. Cl.
G06F 12/00 (2006.01)
G06F 13/00 (2006.01)
G06F 13/28 (2006.01)

(52) U.S. Cl. .............. 711/170; 711/104; 711/E12.016
(58) Field of Classification Search ............. None
See application file for complete search history.

(56) References Cited

U.S. PATENT DOCUMENTS

| | | | |
|---|---|---|---|
| 5,581,737 A | 12/1996 | Dahlen et al. |
| 5,752,255 A | 5/1998 | Jarvis |
| 5,822,562 A | 10/1998 | Dahlen et al. |

(Continued)

OTHER PUBLICATIONS

Nimrod Megiddo et al., "ARC: A Self-Tuning, Low Overhead Replacement Cache", 2003, USENIX Association, FAST '03; 2nd USENIX Conference on File and Storage Technologies.

(Continued)

*Primary Examiner*—Matt Kim
*Assistant Examiner*—Christopher D Birkhimer
(74) *Attorney, Agent, or Firm*—Kunzler Needham Massey & Thorpe

(57) ABSTRACT

A method is disclosed for dynamically allocating main memory among applications. The method includes maintaining a first list and a second list, each list having a plurality of pages, maintaining a cache memory module having a selected size, and resizing the selected size by adaptively selecting the first or second list and adding pages to the selected list to increase the selected size and subtracting pages from the selected list to decrease the selected size.

2 Claims, 7 Drawing Sheets

U.S. PATENT DOCUMENTS

| | | | |
|---|---|---|---|
| 5,897,660 | A | 4/1999 | Reinders et al. |
| 6,366,994 | B1 | 4/2002 | Kalyur |
| 6,378,043 | B1 | 4/2002 | Girkar et al. |
| 6,408,368 | B1 | 6/2002 | Parady |
| 6,415,368 | B1 | 7/2002 | Glance et al. |
| 6,421,766 | B1 | 7/2002 | Jones, Jr. |
| 6,493,800 | B1 | 12/2002 | Blumrich |
| 6,615,318 | B2 | 9/2003 | Jarvis et al. |
| 6,658,532 | B1 | 12/2003 | Horrigan et al. |
| 6,996,676 | B2 | 2/2006 | Megiddo et al. |
| 2002/0156980 | A1 | 10/2002 | Rodriguez |
| 2003/0014603 | A1 | 1/2003 | Sasaki et al. |
| 2003/0105926 | A1 | 6/2003 | Rodriguez |
| 2003/0236961 | A1 | 12/2003 | Qiu et al. |
| 2004/0098541 | A1* | 5/2004 | Megiddo et al. ............ 711/129 |
| 2005/0235114 | A1* | 10/2005 | Megiddo et al. ............ 711/118 |

OTHER PUBLICATIONS

Paul Horan, "Page Size vs Cache Size", Feb. 13, 2001, Google Groups, http://groups.google.com/?hl=en, search string (cache + "empty pages").

Webopedia, "Cache", Sep. 16, 2004, p. 1-5, http://www.webopedia.com/TERM/c/cache.html.

Webopedia, "Operating System", Jan. 4, 2002, p. 1-5, http://webopedia.com/TERM/o/operating_system.html.

Sorav Bansal et al., "ARC Refinements", pp. 1-3. Jul. 16, 2003.

Sorav Bansal et al., "CAR: Clock with Adaptive Replacement", Stanford University, IBM Almaden Research Center, pp. 1-14.

* cited by examiner

APPARATUS, SYSTEM, AND METHOD FOR DYNAMICALLY ALLOCATING MAIN MEMORY AMONG A PLURALITY OF APPLICATIONS

CROSS-REFERENCE TO RELATED APPLICATION

This application is a continuation of U.S. patent application Ser. No. 11/014,529 filed on Dec. 15, 2004, entitled APPARATUS, SYSTEM, AND METHOD FOR DYNAMICALLY ALLOCATING MAIN MEMORY AMONG A PLURALITY, which is incorporated herein by reference.

BACKGROUND

1. Field

This invention relates to data processing systems, and in particular to adaptive replacement cache policies that minimize cache misses, and more particularly relates to adaptive replacement based cache policies that resize cache memory.

2. Description of the Related Art

Computer memory systems generally comprise two memory levels: main (or cache) and auxiliary. Cache memory is faster than auxiliary memory, but is also significantly more expensive. Consequently, the size of the cache memory is usually only a fraction of the size of the auxiliary memory.

Caching is one of the fundamental metaphors in modern computing. It is widely used in storage systems, databases, web servers, middleware, processors, file systems, disk drives, and operating systems. Memory caching is also used in varied and numerous other applications such as data compression and list updating. As a result a substantial progress in caching algorithms could affect a significant portion of the modern computation stack.

Both cache and auxiliary memories are managed in units of uniformly sized items known as pages of memory or cache lines. Requests for pages of memory (hereinafter "pages") are first directed to the cache. A request for a page is directed to the auxiliary memory only if the page is not found in the cache. In this case, a copy is "paged in" to the cache from the auxiliary memory. This is called "demand paging" and it precludes "pre-fetching" pages from the auxiliary memory to the cache. If the cache is full, one of the existing pages must be paged out before a new page can be brought in.

A replacement policy determines which page is "paged out." A commonly used criterion for evaluating a replacement policy is the hit ratio, the frequency at which a page is found in the cache as opposed to finding the page in auxiliary memory. The miss rate is the fraction of pages paged into the cache from the auxiliary memory. The replacement policy goal is to maximize the hit ratio measured over a very long trace while minimizing the memory overhead involved in implementing the policy.

Most current replacement policies remove pages from the cache based on "recency" that is removing pages that have least recently been requested, "frequency" that is removing pages that are not often requested, or a combination of recency and frequency. Certain replacement policies also have parameters that must be carefully chosen or "tuned" to achieve optimum performance.

The most commonly used replacement policy is based on the concept of replace the least recently used (LRU) page. The LRU policy focuses solely on recency, always replacing the least recently used page. LRU, as one of the original replacement policies, has many areas which may be improved upon.

LRU has several advantages: it is relatively simple to implement and responds well to changes in the underlying stack depth distribution model. However, while the stack depth distribution model captures recency, it does not capture frequency. Each page is equally likely to be referenced and stored in cache. Consequently, the LRU model is useful for treating the clustering effect of locality but not for treating non-uniform page referencing. Additionally, the LRU model is vulnerable to one-time-only sequential read requests, or scans, that replace higher-frequency pages with pages that would not be requested again, reducing the hit ratio. In other terms, the LRU model is not "scan resistant."

Another commonly used replacement policy is the least frequently used (LFU) algorithm. As suggested by the name, the LFU policy focuses on frequency, always replacing the least frequently used page. While the LFU policy is scan-resistant, it presents several drawbacks. The LFU policy requires logarithmic implementation complexity in cache size and pays almost no attention to recent history. In addition, the LFU policy does not adapt well to changing access patterns since it accumulates state pages with high frequency counts that may no longer be useful.

Over the past few years, interest has focused on combining recency and frequency in various ways, attempting to bridge the gap between LRU and LFU. Three replacement policy algorithms exemplary of this approach are Adaptive Replacement Cache (ARC), CLOCK with Adaptive Replacement (CAR), and CAR with Temporal filtering (CART).

The basic idea behind ARC is to maintain two LRU lists of pages. One list, $L_1$, contains pages that have been seen only once "recently," while the second list, $L_2$, contains pages that have been seen at least twice "recently." The items that have been seen twice within a short time have a low inter-arrival rate, and therefore are thought of as "high-frequency." In other words, $L_1$ captures "recency" while $L_2$ captures "frequency." The ARC policy dynamically decides, in response to an observed workload, whether to replace an item from $L_1$ or $L_2$.

CAR builds on ARC by implementing portions of the CLOCK algorithm. The CLOCK algorithm maintains a page reference bit with every page. When a page is first brought into the cache, its page reference bit is set to zero. The pages in the cache are organized in a circular buffer known as a clock. On a hit to a page, the page reference bit is set to one. Replacement is done by moving a clock hand through the circular buffer and replacing pages with page reference bits set to zero.

The basic idea of CAR is to maintain two clocks, for example $T_1$ and $T_2$, where $T_1$ contains pages with recency or short-term utility and $T_2$ contains pages with frequency or long-term utility. New pages are first inserted into $T_1$ and graduate to $T_2$ upon passing a certain test of long-term utility.

The algorithms ARC and CAR consider two consecutive hits to a page as a test of long-term utility. At upper levels of memory hierarchy, for example, virtual memory, databases, and file systems, consecutive page hits occur fairly quickly. Such consecutive page hits are not a guarantee of long-term utility. This problem is solved by the temporal filtering of CART. The basic idea behind CART is to maintain a temporal locality window such that pages that are re-requested within the window are of short-term utility whereas pages that are re-requested outside the window are of long-term utility.

ARC, CAR, and CART greatly maximize the hit rate while minimizing the computational and space overhead involved with implementing cache replacement policies. However, each policy suffers from not being able to grow or shrink the cache. When shrinking an LRU cache, the algorithm simply discards the least-recently used pages, and when growing the LRU cache, the algorithm adds storage as empty pages. Since ARC, CAR, and CART maintain multiple lists, shrinking or growing the cache is not as simple as adding to or removing from the LRU.

Shrinking the cache is desirable in situations where resources need to be reallocated. For example, common computing systems have the capability to run multiple operating systems. Software that enables the computing system to run multiple operating systems "virtualizes" the operating system. The virtual operating system has access to the computing system's resources such as processor, cache (also referred to as RAM), and auxiliary memory. The virtual operating system operates in what is commonly referred to as "sandbox environment," insulated from other virtual operating systems.

As a new virtual operating system is started, cache needs to be allocated to the new virtual operating system and consequently removed from other programs. Removing, or shrinking the size of the cache allocated to a particular virtual operating system is a simple task for LRU algorithms, as discussed above. However, there is no method for shrinking or growing cache with ARC, CAR, and CART algorithms.

From the foregoing discussion, it should be apparent that a need exists for an apparatus, system, and method that adjust cache size using ARC, CAR, and CART algorithms. Beneficially, such an apparatus, system, and method would monitor application load changes and update cache size by adding new empty pages for cache growth, and to choose pages to discard for cache shrinkage.

SUMMARY OF THE INVENTION

The present invention has been developed in response to the present state of the art, and in particular, in response to the problems and needs in the art that have not yet been fully solved by currently available cache replacement algorithms. Accordingly, the present invention has been developed to provide an apparatus, system, and method for dynamically allocating main memory among a plurality of applications that overcome many or all of the above-discussed shortcomings in the art.

The apparatus to dynamically allocate memory is provided with a logic unit containing a plurality of modules configured to functionally execute the necessary steps of resizing a cache memory. These modules in the described embodiments include a cache memory module configured to maintain at least a first list and a second list, each list having a plurality of pages, wherein the cache memory module has a capacity to store c pages. The apparatus may also include a resize module configured to resize c by adaptively selecting the first or second list and adding pages to the selected list to increase the size of c and subtracting pages from the selected list to decrease the size of c.

In one embodiment, each list comprises a first portion (T) and a second portion (B), wherein the first portion (T) is configured to maintain the plurality of pages, and wherein the second portion (B) is configured to maintain history information about recently evicted pages. The first list contains pages that have been requested exactly once since the last time the pages were removed from the first list, and the second list contains pages that have been requested more than once since the last time the pages were removed from the second list.

In a further embodiment, the apparatus is further configured to select a list and a portion of the list and add empty pages to the portion. In addition, the apparatus may be configured to select a list and a portion of the list and remove pages from the portion. In one embodiment, adaptively selecting a list and a portion of the list further comprises removing a page from the second portion (B) if the sum of the first portions (T) is greater than c, and if the sum of the second portions (B) is greater than c.

A system of the present invention is also presented to dynamically allocate main memory. In particular, the system, in one embodiment, includes a cache memory module configured to maintain a first list and a second list, a cache replacement module configured to adaptively distribute a workload between the first list and the second list, and a resize module configured to resize c by adaptively adding or subtracting pages from the plurality of lists.

A method of the present invention is also presented for dynamically allocating main memory among a plurality of applications. The method in the disclosed embodiments substantially includes the steps necessary to carry out the functions presented above with respect to the operation of the described apparatus and system. In one embodiment, the method includes maintaining at least a first list and a second list, each list having a plurality of pages, storing c pages, and resizing c by adaptively selecting the first or second list and adding pages to the selected list to increase the size of c and subtracting pages from the selected list to decrease the size of c.

A method for deploying a computing infrastructure is also provided. The method comprises integrating computer-readable code into a computing system, wherein the code in combination with the computing system is capable of dynamically allocating main memory among a plurality of applications. In one embodiment, the method comprises maintaining at least a first list and a second list, each list having a plurality of pages, storing c pages, and resizing c by adaptively selecting the first or second list and adding pages to the selected list to increase the size of c and subtracting pages from the selected list to decrease the size of c.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
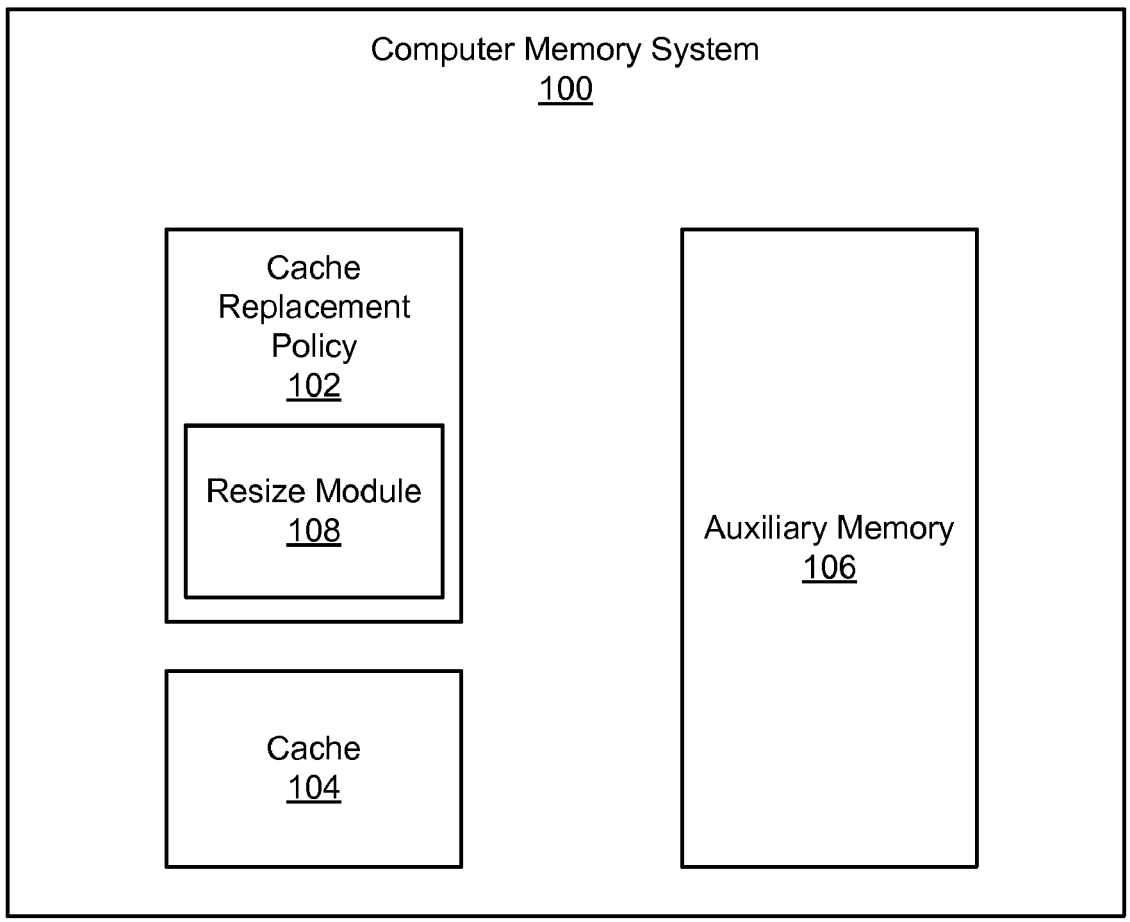
FIG. 1 is a schematic block diagram illustrating one embodiment of a computer memory system for dynamically allocating main memory among a plurality of applications in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a computer memory system 100 that is configured to dynamically allocate main memory among a plurality of applications. In one embodiment, the computer memory system 100 comprises a cache replacement policy 102 that utilizes a cache memory module (hereinafter "cache") 104 and an auxiliary memory 106. Having certain data stored in cache 104 speeds up the operation of a computer processor (not shown).

Auxiliary memory 106 may comprise hard disk storage, optical storage, tape storage, DRAM, or the like, and in one embodiment, be orders of magnitude larger in capacity than the cache 104. The cache 104 is configured to retrieve pages from the auxiliary memory 106 and store the pages for future requests. As used herein, page refers to uniformly sized objects, items, or block of memory in cache 104 and/or auxiliary memory 106.

The cache 104 has a maximum capacity c which may be a physical storage capacity, or a virtual storage capacity. For example, the cache 104 may be allocated to a plurality of operating systems functioning on a common computer system. Each operating system is allocated a portion of the cache 104 for use. The operating system is not aware of other operating systems, and uses the allocated portion of the cache 104 as if the allocated portion were the entire cache 104. If an operating system is added, portions of the cache must be taken from the original operating system(s) and given to the new operating system, or in other terms, c must be resized for each operating system. One skilled in the art of memory management will recognize this situation applies not only to operating systems, but many situations such as, but not limited to, applications sharing memory.

In one embodiment, the cache replacement policy 102 is configured to maintain a plurality of lists for managing pages present in the cache 104. Additionally, the cache replacement policy 102 is configured to determine which page to replace when the capacity c has been reached and a new page is read into the cache 104. In a further embodiment, the cache replacement policy 102 maintains a first list $L_1$ and a second list $L_2$. The cache replacement policy 102 may also include a resize module 108 configured to adaptively adjust the size c of the cache 104 by adaptively selecting a list from which to add or subtract a page.

Figure 2:
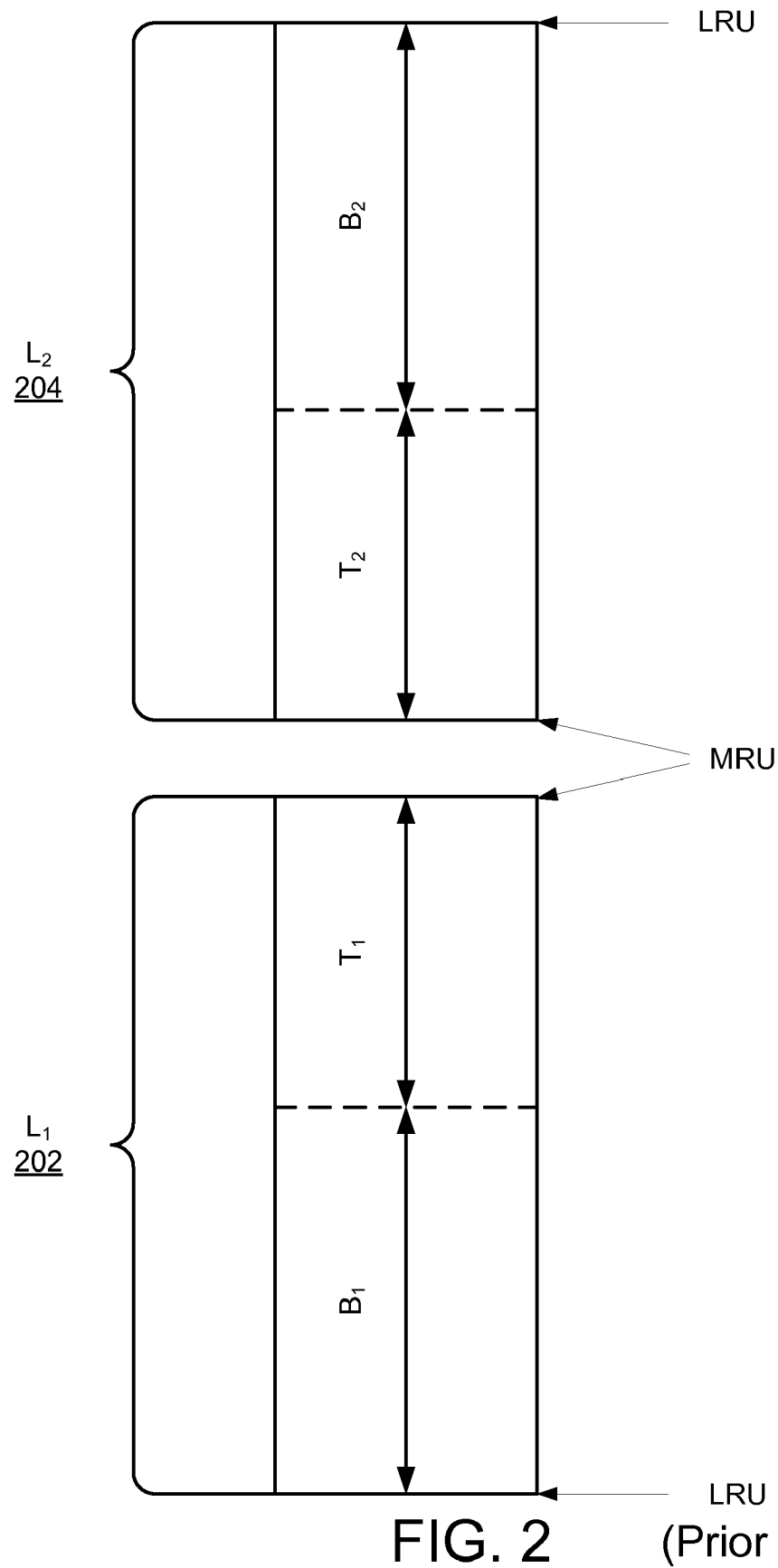
FIG. 2 is a schematic block diagram illustrating one embodiment of lists $L_1$ and $L_2$ for dynamically allocating main memory among a plurality of applications in accordance with the prior art.

FIG. 2 is a schematic block diagram illustrating one embodiment of the lists $L_1$ 202 and $L_2$ 204 for dynamically allocating main memory among a plurality of applications in accordance with the present invention. The list $L_1$ 202 contains pages requested only once recently, and establishes the recency aspect of page requests. The list $L_2$ 204 contains pages requested at least twice recently, and establishes the frequency aspect of page requests. The pages are sorted in each list from most recently used (MRU) to least recently used (LRU), as shown by the arrows in the list $L_1$ 202 and the list $L_2$ 204. In one embodiment, each list 202, 204 comprises at least two portions, T and B. The T portion is configured to maintain pages stored in cache, and the B portion is configured to maintain pages recently replaced in the T portion.

The lists 202, 204 as depicted in FIG. 2 illustrate one embodiment of an Adaptive Replacement Cache (ARC) policy. One example of an implementation of ARC is described in United States Patent Application Publication No. US 2004/0098541, and is incorporated herein by reference.

Figure 3:
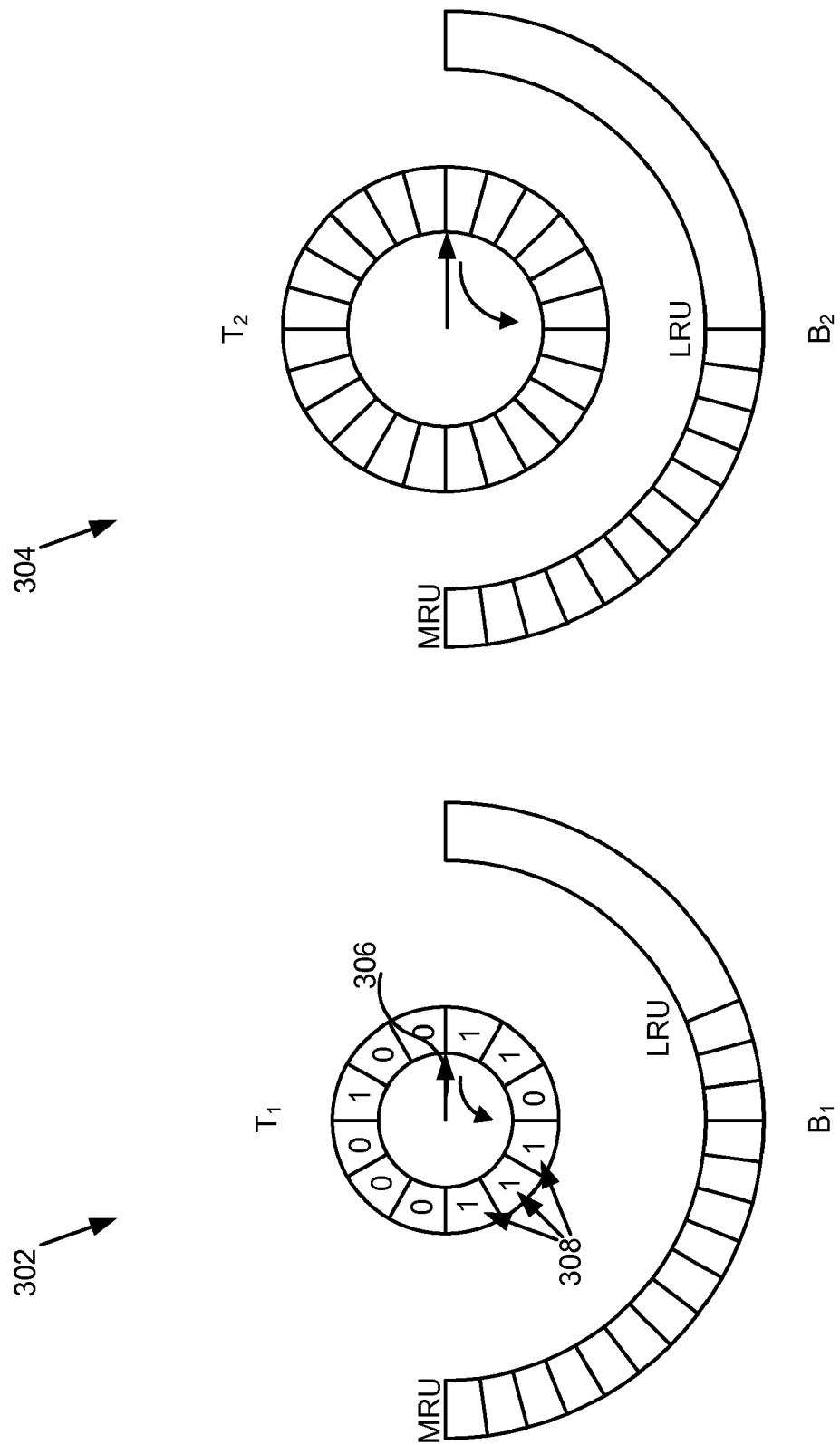
FIG. 3 is a schematic block diagram illustrating an alternative embodiment of the lists $L_1$ and $L_2$ in accordance with the prior art.

FIG. 3 is a schematic block diagram illustrating an alternative embodiment of the lists $L_1$ 302 and $L_2$ 304 suitable for use with the present invention. The T portion of the lists, $T_1$ for the list $L_1$ 302 and $T_2$ for the list $L_2$ 304 may be implemented in a circular manner in order to simulate a clock. As depicted, the lists 302, 304 may be implemented in a manner substantially equivalent to the embodiment of FIG. 2, however with the addition of a sweeping clock arm 306.

Each list 302, 304 may be configured with a clock arm 306, the clock arm 306 configured to sweep around the list 302 and check the reference bit 308. In one embodiment, the reference bit 308 may be set to 1 if the corresponding page has been requested since the last sweep. If a reference bit 308 is set to 0, the cache replacement module 102 may move the page to a $B_1$ portion. A similar situation may occur with the list $L_2$ 304. A cache replacement algorithm such as described above is known as CLOCK with Adaptive Replacement (hereinafter "CAR"), a derivative of ARC.

Alternatively, CAR may be further modified to maintain a temporal locality window (not shown) such that pages that are re-requested within the window are of short term utility whereas pages that are re-requested outside the window are of long-term utility. Although ARC, CAR, and CART are disclosed herein, the methods of FIGS. 4, 5, and 6 may be applied to any cache replacement policy configured to maintain at least a first list and a second list.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
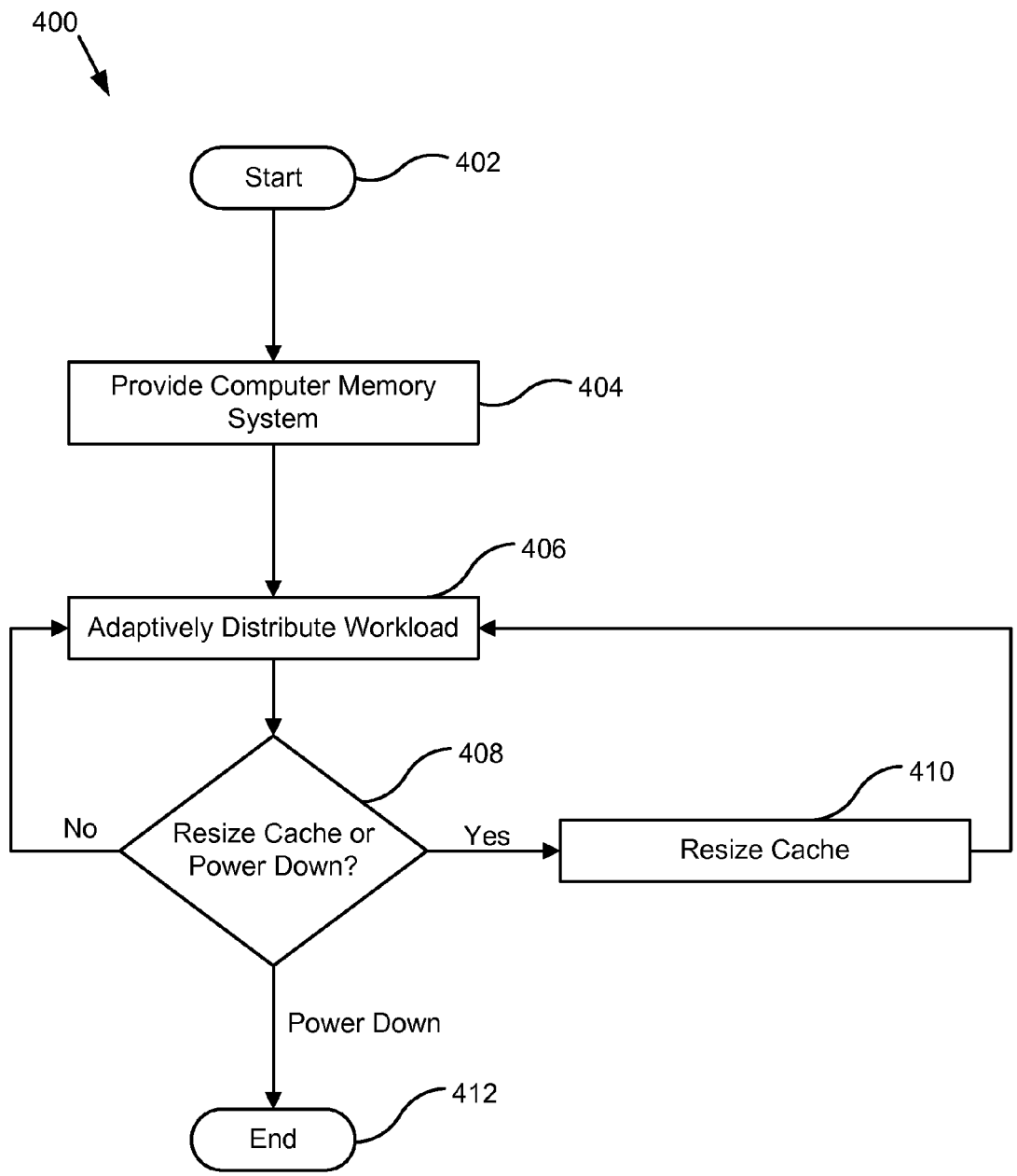
FIG. 4 is a schematic flow chart diagram illustrating one embodiment of a method for dynamically allocating main memory among a plurality of applications in accordance with the present invention.

FIG. 4 is a schematic flow chart diagram illustrating one embodiment of a method 400 for dynamically allocating main memory among a plurality of applications in accordance with the present invention. The method 400 starts 402 and the computer memory system 100 is provided 404 and configured as described above with reference to FIG. 1. The cache replacement policy 102 may comprise any cache replacement algorithm configured to maintain a plurality of lists, and adaptively distribute 406 a workload among the lists. In one embodiment, the cache replacement policy 102 comprises the ARC algorithm. Alternatively, the cache replacement policy 102 may comprise any ARC based or similar adaptive algorithm such as, but not limited to, CAR, and CART.

If the cache replacement policy 102 determines that the cache 104 must be resized 408 to accommodate an application, the resize module 108 resizes 410 the cache 104. In one embodiment, resizing 410 the cache comprises removing or deleting pages from the plurality of lists until a selected size, or capacity c is reached. The resize module 108 is configured to select a list and remove a page from the list. Additionally, the resize module 108 may resize 410 the cache 104 by adding a page to a list. The method 400 continues, and the cache replacement policy 102 resumes adaptive workload distribution 406. The cache replacement policy 102 adaptively distributes 406 the workload until a resize is requested, or the computer memory system 100 is powered down, at which point the method 400 ends 412. Resizing 410 the cache will be discussed in greater detail below with reference to FIGS. 5 and 6.

Figure 5:
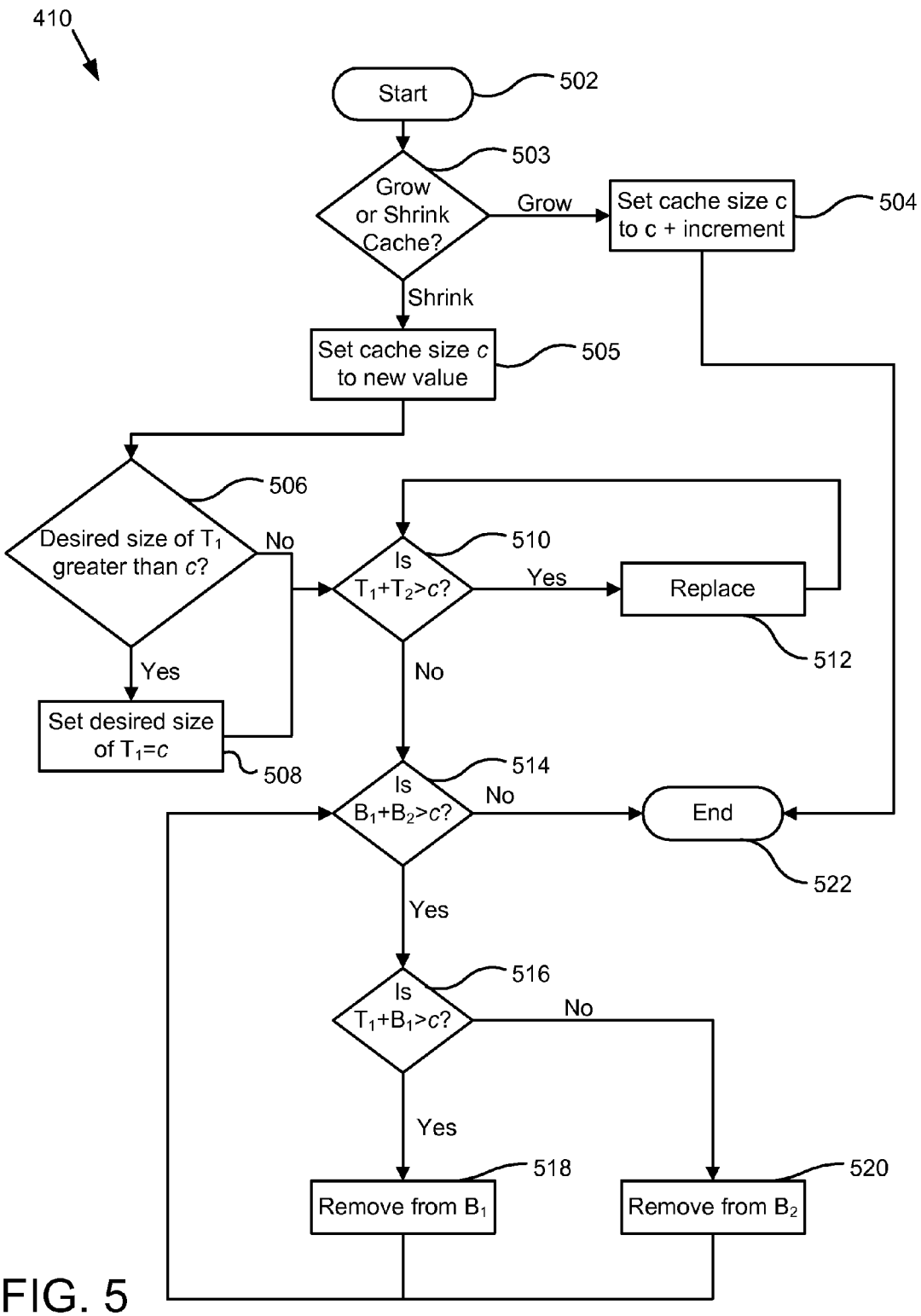
FIG. 5 is a schematic flow chart diagram illustrating one embodiment of a method for resizing the cache in accordance with the present invention.

FIG. 5 is a schematic flow chart diagram illustrating one embodiment of a method for resizing 410 the cache 104 in accordance with the present invention. In one embodiment, the method 410 starts 502 and the resize module 108 determines whether to grow or shrink 503 the cache. If the computer memory system 100 requires cache, or needs to reallocate cache from a first application to a second application, for example, then the resize module 108 will shrink 503 the cache. In one embodiment, shrinking the cache comprises reducing or removing a selected amount of pages from the first list or the second list. Alternatively, if the computer memory system 100 allocates more memory, the resize module 108 may grow 503 the cache by setting 504 the cache size c to equal the original size c plus an increment.

If the resize module decides to shrink 503 the cache, the resize module 108 sets 505 a new value for the size c of the cache 104. The resize module 108 then determines if the desired size of $T_1$ is greater 506 than c. The desired size of $T_1$ is a tunable parameter that may be adjusted on the fly by the cache replacement policy 102. If the desired size of $T_1$ is greater 506 than the new c, then the resize module 108 sets 508 the desired size of $T_1$ to have the same value as c.

The resize module 108 may then determine if the sum of the sizes of $T_1$ and $T_2$ is greater than c. If yes, the resize module 108 performs a replace 512 function. In one embodiment, the replace function discards the page in cache 104 instead of replacing the page with a new page from auxiliary memory 106. The resize module 108 continues to replace 512 pages until the sum of the sizes of $T_1$ and $T_2$ is less than c. Once the sum of the sizes of $T_1$ and $T_2$ is less than c, the resize module 108 is configured to determine if the sum of the sizes of $B_1$ and $B_2$ is greater 514 than c.

While sum of the sizes of $B_1$ and $B_2$ is greater 514 than c, and if the sum of the sizes of $T_1$ and $B_1$ is also greater 516 than c, the resize module removes 518 pages from the $B_1$ list. If the sum of the sizes of $T_1$ and $B_1$ is less 516 than c, then the resize module is configured to remove 520 pages from the $B_2$ list.

Once the sum of the sum of the sizes of B and $B_2$ is less 514 than c, the method 410 ends 522.

The method 410 may be used with the cache replacement algorithm ARC, or other similar multi-list cache replacement policies that attempt to capture recency in a first list, and frequency in a second list. In one embodiment, the method 410 may also be implemented with the cache replacement policy CAR. The method 410 of FIG. 5 may be based on the following code outline given by way of example:

```
GROW
c = c + increment
SHRINK
c = c - increment
if (p > c) then
    p=c;
    /* p is the desired size of T_1 */
if ( |T_1| + |T_2| > c) then
    while ( |T_1| + |T_2| > c ) then
        replace( );
        /* discard cache frame containing the page removed from cache by
        replace( )*/
    endwhile
    while (|B_1| + |B_2| > c ) then
        if (|T_1| + |B_1| > c ) then
            remove page from B_1
        else
            remove page from B_2
        endif
    endwhile
endif
```

Figure 6:
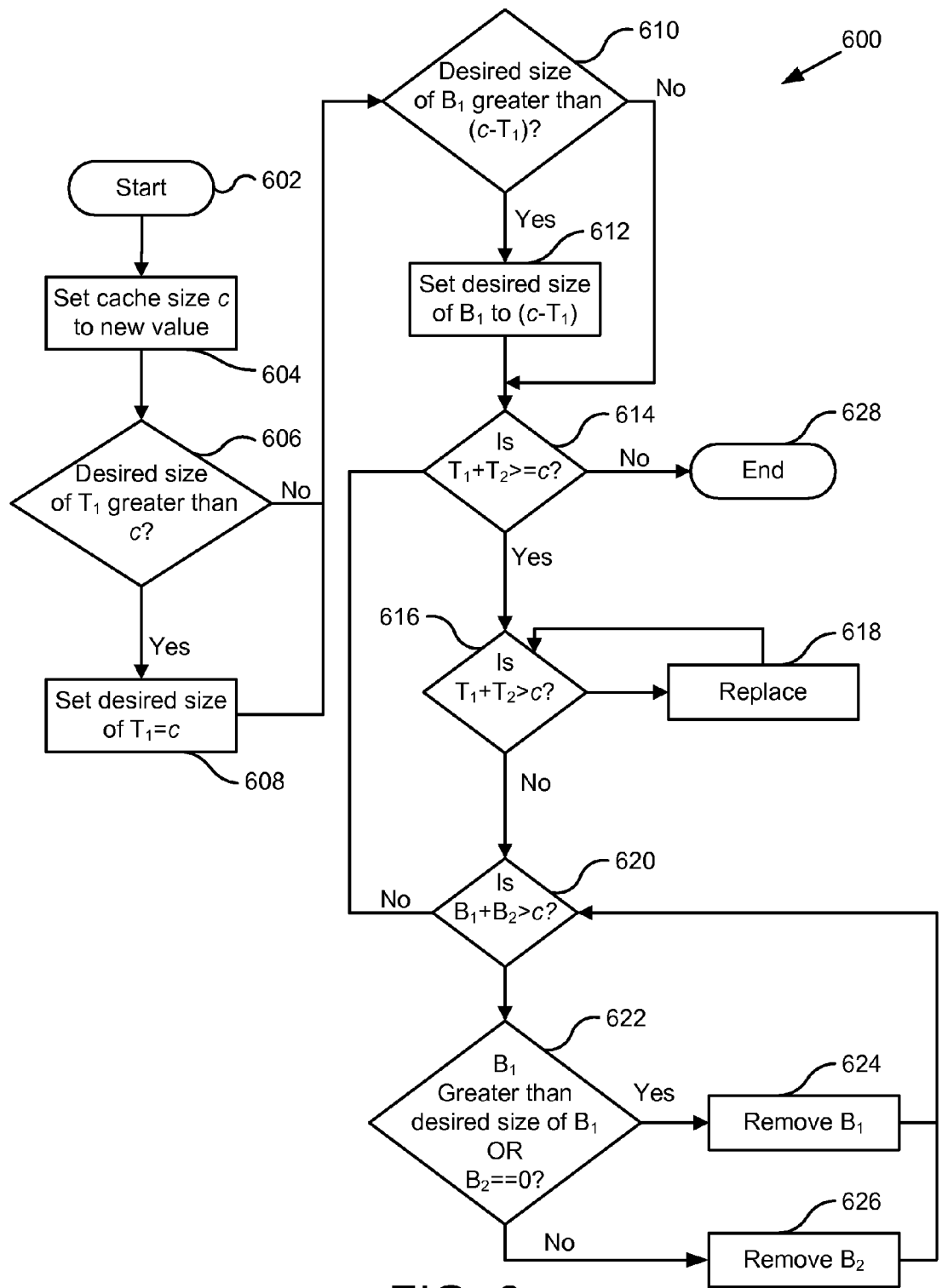
FIG. 6 is a schematic block diagram illustrating an alternative embodiment of a method for resizing the cache in accordance with the present invention.

FIG. 6 is a schematic block diagram illustrating an alternative embodiment of a method 600 for resizing the cache 104 in accordance with the present invention. The method 600 starts 602 and the resize module 108 sets 604 a new value for the size c of the cache 104. The resize module 108 then determines if the desired size of $T_1$ is greater 606 than c. The desired size of $T_1$ is a tunable parameter that may be adjusted on the fly by the cache replacement policy 102. If the desired size of $T_1$ is greater 606 than the new c, then the resize module 108 sets 608 the desired size of $T_1$ to have the same value as c.

In one embodiment, the resize module 108 then determines if the desired size of $B_1$ is greater 610 than the difference between c and the size of $T_1$. If yes, the resize module 108 is configured to set 612 the desired size of $B_1$ to be equal to the difference between c and $T_1$. Otherwise, the desired size of $B_1$ is not adjusted.

The resize module 108 may then determine if the sum of the sizes of $T_1$ and $T_2$ is greater 614 than or equal to c. While the sum of the sizes of $T_1$ and $T_2$ is greater 616 than c, the resize module 108 performs 618 the replace function. In one embodiment, the replace function discards the page in cache 104 instead of replacing the page with a new page from auxiliary memory 106. Once the sum of the sizes of $T_1$ and $T_2$ is less 616 than c, and while the sum of the sizes of $B_1$ and $B_2$ is greater 620 than c, the resize module 108 selectively removes 624, 626 a page from either $B_1$ or $B_2$.

In one embodiment, selectively removing a page from either $B_1$ or $B_2$ comprises the resize module 108 determining if the size of $B_1$ is greater 622 than the desired size of $B_1$. If so, the resize module 108 removes 624 a page from $B_1$ until the size of $B_1$ is equal to the desired size of $B_1$. Also, if the size of $B_2$ is equal 622 to zero, or in other words the list $B_2$ is empty, then the resize module 108 removes 624 a page from $B_1$. Alternatively, the resize module 108 removes 626 a page from $B_2$. Once the sum of the sizes of $T_1$ and $T_2$ is smaller than c, and the sum of the sizes of $B_1$ and $B_2$ is smaller than c, the method 600 ends 628.

Figure 7:
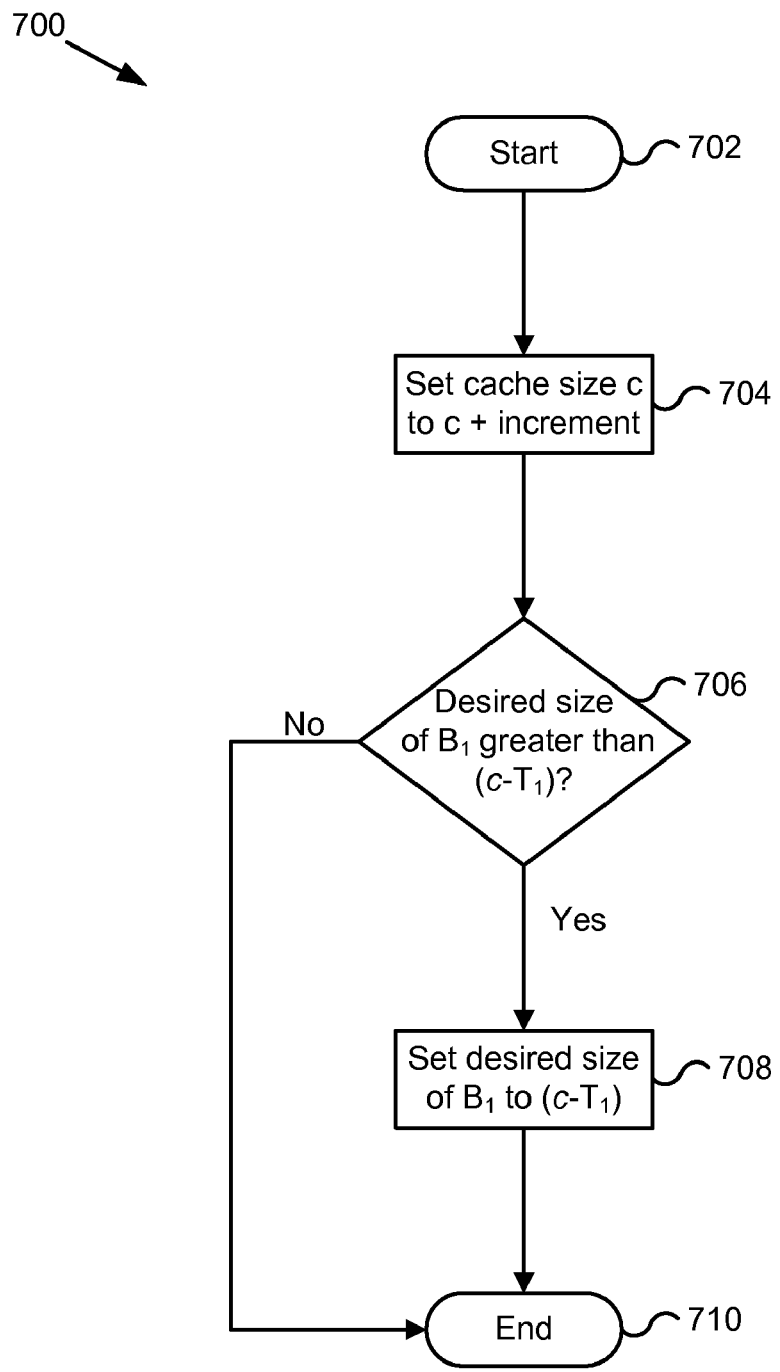
FIG. 7 is a schematic block diagram illustrating another embodiment of a method for resizing the cache in accordance with the present invention.

FIG. 7 is a schematic flow chart diagram illustrating one embodiment of a method 700 for growing the cache with multi-list cache replacement policies using temporal filtering in accordance with the present invention. In one embodiment, the method 700 starts 702 and the resize module 108 sets 704 the cache size c to a new value. In a further embodiment, setting the cache size c to a new value comprises setting 704 c equal to c plus an increment. The resize module 108 then determines if the desired size of $B_1$ is greater 706 than the difference between the size of c and the size of $T_1$. If so, the resize module 108 sets 708 the desired size of $B_1$ equal to the difference between the size of c and the size of $T_1$. If not, the method 700 ends 710.

In a further embodiment, growing the cache size may comprise the resize module 108 not calling a replace function, and letting new page requests fill the cache until the cache size c is reached. For example, the resize module 108 will only perform a replace function when the sum of the sizes of $T_1$ and $T_2$ exceed c.

The methods 600, 700 may be used with the cache replacement algorithm CART, or other similar multi-list cache replacement policies that attempt to capture recency in a first list, and frequency in a second list with temporal filtering. The method 600 of FIG. 6 may be based on the following code outline given by way of example:

```
GROW
c = c + increment
if ( q > 2*c - T_1 )
    q = 2*c - T_1
    /* q is the desired size of B_1 */
endif
SHRINK
c = c - increment
if (p > c) then
    p=c;
    /* p is the desired size of T_1 */
endif
if (q > c - |T_1| ) then
    q = c - |T_1|
endif
while ( |T_1| + |T_2| >= c) then
    while ( |T_1| + |T_2| > c ) then
        replace( );
        /* discard cache frame containing the page removed from cache by
        replace( )*/
    endwhile
    while (|B_1| + |B_2| > c ) then
        if ((|B_1| > max( 0 , q ) OR |B_2| = = 0 ) then
            remove page from B_1
        else
            remove page from B_2
        endif
    endwhile
endwhile
```

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for dynamically allocating main memory among a plurality of virtual operating systems, the method comprising:

maintaining at least a first list and a second list, the first list containing pages requested only once since a last removal of a page from the first list and the second list containing pages requested at least twice since a last removal of pages from the second list and each list configured to store a plurality of pages, each list having a T portion and a B portion;

maintaining a cache memory module allocated to a virtual operating system and having an allocation of pages; and shrinking the allocation by setting a size of the T portion of the first list to a new allocation, discarding pages from the T portions of the first and second lists until a sum of sizes of the T portions of the first and second lists is less than the new allocation, and if a sum of sizes of the T and B portions of the first list is greater than the new allocation, removing pages from the B portion of the first list until a sum of sizes of the B portions of the first and second lists is less than the new allocation else removing pages from the B portion of the second list until the sum of the sizes of the B portions of the first and second lists is less than the new allocation.

2. A method for deploying a computing infrastructure, comprising integrating computer-readable code into a computing system, wherein the code in combination with the computing system is capable of dynamically allocating main memory among a plurality of virtual operating systems, the method comprising:

maintaining at least a first list and a second list, the first list containing pages requested only once since a last removal of a page from the first list and the second list containing pages requested at least twice since a last removal of pages from the second list and each list configured to store a plurality of pages, each list having a T portion and a B portion;

maintaining at least one cache memory module allocated to a virtual operating system and having an allocation of pages; and shrinking the allocation by setting a size of the T portion of the first list to a new allocation, discarding pages from the T portions of the first and second lists until a sum of sizes of the T portions of the first and second lists is less than the new allocation, and if a sum of sizes of the T and B portions of the first list is greater than the new allocation, removing pages from the B portion of the first list until a sum of sizes of the B portions of the first and second lists is less than the new allocation else removing pages from the B portion of the second list until the sum of the sizes of the B portions of the first and second lists is less than the new allocation.

* * * * *